(12) United States Patent
Peterson

(10) Patent No.: US 7,188,815 B2
(45) Date of Patent: Mar. 13, 2007

(54) FASTENER WITH TETHERED MEMBERS

(75) Inventor: Rex J. Peterson, Manteno, IL (US)

(73) Assignee: Illnois Tool Works Inc, Glenview, IL (US)

( * ) Notice: Subject to any disclaimer, the term of this patent is extended or adjusted under 35 U.S.C. 154(b) by 81 days.

(21) Appl. No.: 11/144,963

(22) Filed: Jun. 3, 2005

(65) Prior Publication Data
US 2006/0273229 A1 Dec. 7, 2006

(51) Int. Cl.
*A47G 1/10* (2006.01)
(52) U.S. Cl. .................. 248/316.7; 24/297; 24/453
(58) Field of Classification Search .......... 248/316.7, 248/71, 74.1, 74.2, 220.31; 403/298; 411/508; 24/297, 336, 452
See application file for complete search history.

(56) References Cited

U.S. PATENT DOCUMENTS

| | | | |
|---|---|---|---|
| 4,312,614 A * | 1/1982 | Palmer et al. ............... 411/44 |
| 4,424,405 A | 1/1984 | Nattel |
| 4,614,321 A * | 9/1986 | Andre .................. 248/74.2 |
| 4,629,356 A | 12/1986 | Hayashi |
| 4,635,325 A | 1/1987 | Yagi |
| D293,880 S | 1/1988 | Takahashi |
| 4,728,068 A | 3/1988 | Rivkin |
| 5,028,187 A | 7/1991 | Sato |
| 5,165,833 A | 11/1992 | Watanabe et al. |
| 5,671,513 A | 9/1997 | Kawahara et al. |
| 5,694,666 A | 12/1997 | Hamamoto |
| 5,851,097 A * | 12/1998 | Shereyk et al. ............. 411/508 |
| 5,871,320 A | 2/1999 | Kovac |
| 6,449,814 B1 | 9/2002 | Dinsmore et al. |
| 6,511,273 B2 | 1/2003 | Arisaka |
| 6,575,681 B2 | 6/2003 | Kojima et al. |
| 6,715,185 B2 | 4/2004 | Angellotti |
| 6,809,257 B2 * | 10/2004 | Shibuya ................... 174/481 |
| 2004/0049895 A1 | 3/2004 | Draggoo et al. |
| 2004/0052575 A1 | 3/2004 | Draggoo et al. |
| 2004/0052579 A1 | 3/2004 | Draggoo et al. |
| 2005/0079033 A1* | 4/2005 | Benedetti et al. .......... 411/508 |
| 2005/0092870 A1* | 5/2005 | Maruyama ................ 248/71 |

* cited by examiner

*Primary Examiner*—Ramon O Ramirez
(74) *Attorney, Agent, or Firm*—Mark W. Croll; Paul F. Donovan

(57) ABSTRACT

A box prong anchor includes first and second prongs in spaced relation, and a tether connected between the prongs allowing the prongs to bend toward each other without restriction from the tether and to bend away from each other only with corresponding movement of the other of the prongs.

18 Claims, 2 Drawing Sheets

FASTENER WITH TETHERED MEMBERS

FIELD OF THE INVENTION

The present invention relates generally to fasteners, clips and other holding devices configured to be attached to an object and to hold an item in position with respect to the object; and, more specifically, the invention pertains to pronged anchors thereof having deflectable members that can be inserted in holes or openings of the object.

BACKGROUND OF THE INVENTION

Fasteners, clips, anchors and holding devices of different designs have a variety of applications in various structures and assemblies for securing one or more parts of the assembly to other parts of the assembly. Fasteners and clips are used extensively in the automotive industry for securing panels and components to structural members. For example, clips are used to secure interior panels to frame or support members. Clips also are used for securing wires, brake lines, fuel lines and other elongate members at selected locations along the lengths thereof. Such holding devices are configured in a variety of different arrangements depending on the locations in which the device will be installed, the types of articles and things to which the device will be secured, the item designed to be held and the requirements of strength and security for use.

In a known construction, a holding device such as a fastener or clip is secured in an opening or hole of the object to which is attached. Opposed, spaced deflectable members are configured and arranged to deflect toward each other as the holding device is inserted into the hole, and to rebound away from each other after a portion of the deflectable member has passed through the hole. Ledges or other formations on the deflectable members abut a surface adjacent the hole on a side of the hole that is opposite to the side from which the prong was inserted. The ledges or other formations inhibit extraction from the hole by resisting inward deflection of the deflectable member when extraction force is applied.

Holding devices as described above have advantages in that they can be attached relatively quickly and easily by simply being pushed into the hole by hand or mechanically. The holding device is fixed automatically in the installed position on the object. Such holding devices have achieved acceptance for use in so-called "blind attachments", where the item to be held is first attached to the holding device or devices, and the device or devices are then positioned over the holes in the anchoring object and pushed into the hole or holes. Such assemblies can be completed even when the hole of the object to which the holding device will be anchored is not readily visible from the front side or accessible from the back side thereof. Accordingly, such holding devices have been used successfully in many applications.

However, such holding devices are not completely without inadequacies, and improvements thereto are desirable. For example, in some installations and uses it is desirable that the holding device be relatively easy to insert, with little resistance, yet offer significant resistance to removal. It is sometimes difficult to achieve the desired ease of insertion for the holding device with the desired resistance to extraction. Prongs that are easily deflected for insertion tend also to deflect easily when extraction force is applied. Further, it is known that forces acting on the holding device can cause one or less than all of the anchor prongs to bend away from the other prong or prongs, beyond the natural position thereof, in the opposite direction from the direction of deflection for insertion. If bent to an extreme position the prong or prongs can break, rendering the holding device unstable, and perhaps causing demounting of the holding device from the object to which it is attached.

What is needed is a pronged anchoring structure for a holding device having low force required for insertion yet significant resistance to forces toward extraction of the fastener.

SUMMARY OF THE INVENTION

The present invention provides a holding device with a box prong anchor having a tether connected between the prongs of the anchor. The tether does not significantly inhibit deflection of the box prongs toward each other during insertion of the anchor in a hole. However, the tether ties the prongs together for a coupled response against extraction force that would bend the prongs in an opposite direction.

In one aspect thereof, the present invention provides an anchoring structure for a holding device by which the device is secured for use. The anchoring structure has first and second prongs each having a base connected within the device and a distal segment. The first and second prongs are resiliently deflectable with respect to each other and confront each other in spaced relation. A tether is connected to each of the prongs across the space defined between the prongs. The tether is configured and arranged to pull against either of the prongs when the other prong is bent away from it.

In another aspect thereof, the present invention provides a holding device with a holding portion configured for receiving and holding an item. A first box prong anchor is connected to the holding portion and includes a cage. First and second prongs each having a base connected to the cage and a distal segment. The first and second prongs are disposed in spaced relation to each other to define a space there between. The first and second prongs are resiliently deflectable toward each other. A tether is connected to each of the prongs across the space. The tether is configured and arranged to pull against either prong if the other prong is bent outwardly from the cage.

In still another aspect thereof, the present invention provides a box prong anchor with a cage and first and a second prongs connected to the cage in spaced relation to each other. A tether is connected between the first prong and the second prong and extends through the space between the first prong and the second prong.

An advantage of the present invention is providing a box prong structure which deflects easily in a desired direction for insertion or attachment yet provides significant resistance to opposite force directed at detachment.

Another advantage of the present invention is providing box prongs for a mounting or anchoring structure of a holding device such as a clip or fastener that is less likely to break or otherwise deform rendering the clip or fastener non-useful.

Still another advantage of the present invention is providing an anchor structure for a holding device such as a fastener or clip that can be manufactured inexpensively by known techniques.

Other features and advantages of the invention will become apparent to those skilled in the art upon review of the following detailed description, claims and drawings in which like numerals are used to designate like features.

Figure 1:
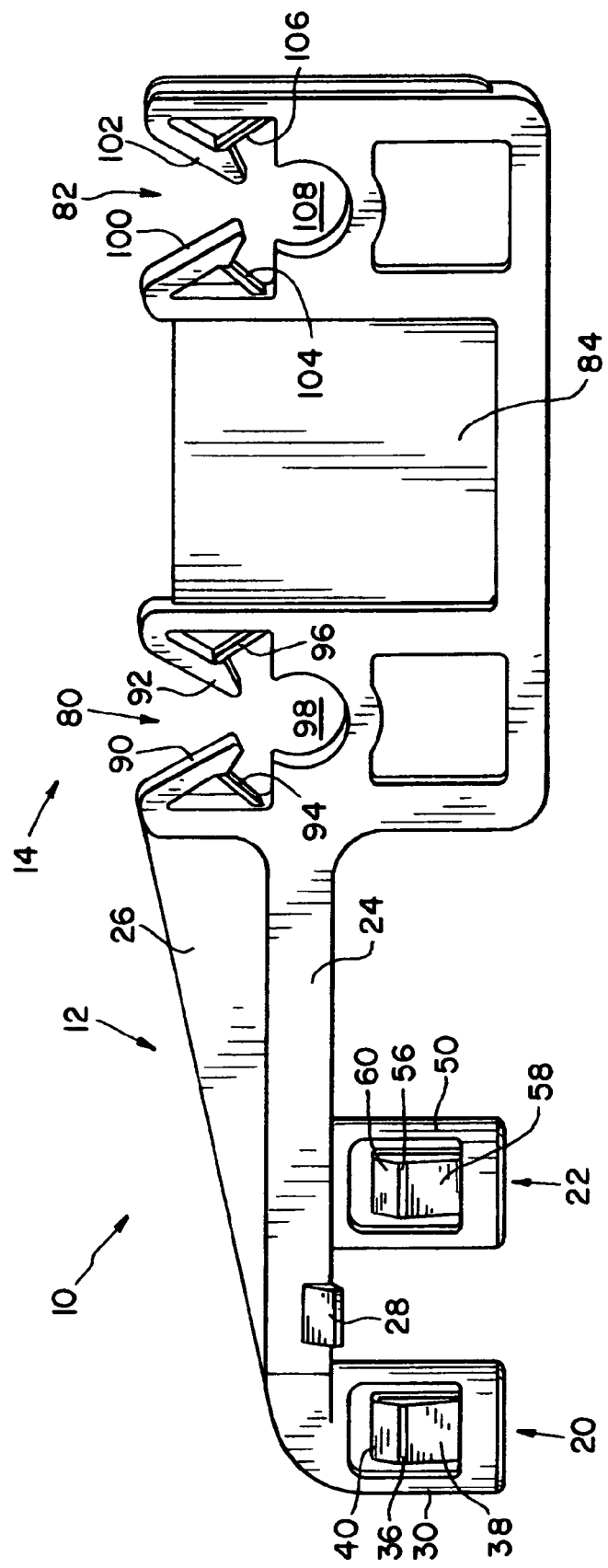
FIG. 1 is a perspective view of a holding device in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a holding device in the nature of a fastener or clip in accordance with the present invention. Holding device 10 includes a monolithic body of relatively rigid plastic material, such as nylon, forming an anchoring structure 12 and a holding portion 14. Anchoring structure 12 is provided for securing or mounting holding device 10 to an object or structure (not shown), and holding portion 14 is provided for receiving or holding an item or thing (not shown).

It should be understood that holding device 10 of the present invention can be configured for holding a variety of items such as, but not limited to brake lines, fuel lines, tubes, wires and the like. Further, holding device 10 can be configured for attachment to a variety of different articles or structures, such as, but again not limited to automobiles or different areas on the articles or structures, such as the frame, body or other parts of an automobile. In that regard, the particular configurations of anchoring structure 12 and holding portion 14 shown and to be described herein are merely exemplary of a suitable application and use of the present invention. The particular configurations of anchoring structure 12 for attachment to different articles, and of holding portion 14 with respect to the items to be held should not be viewed as limiting of the present invention.

Anchoring structure 12 includes first and second box prong anchors 20 and 22, respectively, disposed at spaced locations along an arm 24. Arm 24 is integrally connected with holding portion 14 and may include a gusset 26 or other web-like or supporting and reinforcing structure as required. One or more foot 28 can be positioned at locations along arm 24 for confronting the surface of a panel, body member or other component (not shown) of an object or thing on which holding device 10 is installed.

Figure 2:
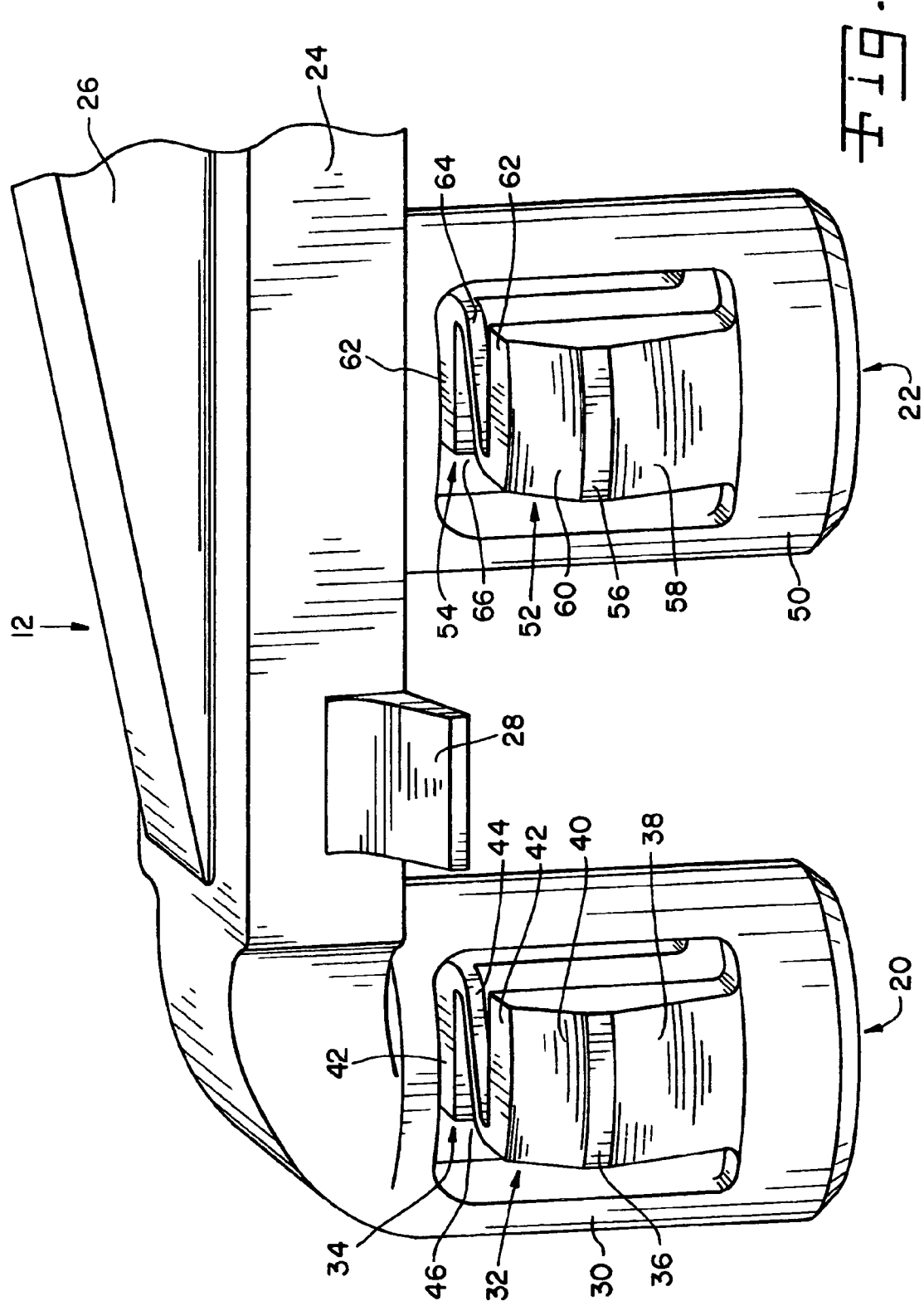
FIG. 2 is an enlarged, fragmentary perspective view of the anchoring structure of a clip in accordance with the present invention.

Box prong anchors, 20, 22 can be seen more clearly in the further enlarged view of FIG. 2. Box prong anchor 20 includes a cage 30 around first and second deflectable prongs 32, 34, respectively. Prongs 32 and 34 confront each other in cage 30, in spaced relation, and are configured for deflection toward each other as box prong anchor 20 is inserted in a hole. Prongs 32 and 34 are similarly configured, and include an enlarged waist 36 between a tapered base 38 and a tapered distal segment 40. An end 42 is configured and arranged to engage an opposite surface of the object or structure on which holding device 10 is installed from that surface of the object or structure confronted by foot 28.

Bases 38 of prongs 32 and 34 are joined to cage 30. Accordingly, as box prong 20 is inserted into a hole or opening in the object or structure on which holding device 10 is installed, bases 38 engage the perimeter of the opening or hole. Since bases 38 taper outwardly toward waist 36, with continued insertion of box prong 20 through a hole, prongs 32 and 34 are deflected progressively inwardly toward one another within cage 30. As waist 36 passes completely through the hole or opening of the object or structure, distal segments 40 engage the perimeter of the opening or hole. Distal segments 40 taper inwardly away from waist 36, thereby allowing prongs 32 and 34 to rebound progressively outwardly away from each other as prongs 32 and 34 are pushed further into the hole or opening, until end 42 has cleared the opening or hole. When fully rebounded outwardly, at least portions of ends 42 are outwardly of the opening or hole, thus securing anchoring structure 12 with the object or structure engaged by foot 28 on one side thereof and by tops 42 on an opposite side thereof.

Prongs 32 and 34 are connected to each other by a tether 44 integrally joined to each prong 32 and prong 34. Tether 44 is disposed in a space 46 between inner confronting surfaces of prongs 32 and 34, and does not interfere significantly with the inward deflection of prongs 32 and 34 as box prong anchor 20 is inserted into an object or structure. In the exemplary embodiment, tether 44 joins opposite sides of prongs 32 and 34. That is, tether 44 is connected to the outer edge of prong 32 and to the inner edge of prong 34, relative to the overall structure of device 10 and the positions of prongs 32 and 34 thereon relative to holding portion 14. Tether 44 extends diagonally across space 46 and moves or folds easily within space 46 as necessary. However, it should be understood that tether 44 also can connect same edges or other portions of the confronting surfaces between prong 32 and prong 34, so long as tether 44 is appropriately configured and arranged to bend, fold or move as necessary within space 46 without interfering significantly with the inward deflection of prongs 32 and 34. Tether 44 can extend substantially the full lengths of prongs 32 and 34, from near ends 42 to near the connection of bases 38 to cage 30. Alternatively, tether 44 can extend less than substantially the full lengths of prongs 32 and 34.

Tether 44 inhibits excessive outward deflection of either prong 32 or prong 34. If a straight, angular, twisting or other extraction force is applied against holding device 10 after installation thereof in an object or structure such that one or both of prongs 32 and 34 is forced in an outward deflection relative to cage 30, tether 44 ties the outward deflection of each prong 32 and prong 34 to necessary bending also of the opposite prong 32 or 34. Thus, neither prong 32 nor prong 34 can be moved outwardly significantly without also bending the other of prongs 32 and 34 inwardly. Whereas insertion of holding device 10 is accomplished with prongs 32 and 34 deflecting inwardly independently, excessive outward movement of either prong 32 or 34, which may occur when an extraction force is applied, is resisted by the coupling of prongs 32 and 34 one to each other such that outward bending of one requires inward bending also of the other. Thus, more force is required for outward bending than for inward deflection. Further, with tether 44 spanning space 46, tether 44 will interfere physically with excessive outward bending of either prong 32 or prong 34 by engaging the edge of the hole in which box prong anchor 20 is installed.

Box prong anchor 22 is constructed similarly to box prong anchor 20. Accordingly, box prong anchor 22 includes a cage 50 around first and second deflectable prongs 52, 54, respectively. Prongs 52 and 54 confront each other in cage 50, in spaced relation, and are configured for deflection toward each other as box prong anchor 22 is inserted in a hole. Prongs 52 and 54 are similarly configured, and include an enlarged waist 56 between a tapered base 58 and a tapered distal segment 60. An end 62 is configured and arranged to engage an opposite surface of the object or structure on which holding device 10 is installed from that surface of the object or structure confronted by foot 28.

Bases 58 of prongs 52 and 54 are joined to cage 50. Accordingly, as box prong 22 is inserted into a hole or opening in the object or structure on which holding device 10 is installed, bases 58 engage the perimeter of the opening or hole, Since bases 58 taper outwardly toward waist 56, prongs 52 and 54 are deflected progressively inwardly toward one another within cage 50. As waist 56 passes completely through the hole or opening of the object or structure, distal segments 60 engage the perimeter of the opening or hole. Distal segments 60 taper inwardly away from waist 56, thereby allowing prongs 52 and 54 to rebound progressively outwardly away from each other as prongs 52 and 54 are pushed further into the hole or opening, until end 62 has cleared the opening or hole. When fully rebounded outwardly, at least portions of ends 62 are outwardly of the opening or hole, thus securing anchoring structure 12 with surfaces of the object or structure engaged by foot 28 on one side thereof and by tops 62 on an opposite side thereof.

Prongs 52 and 54 are connected to each other by a tether 64 integrally joined to each prong 52 and prong 54. Tether 64 is disposed in a space 66 between inner confronting surfaces of prongs 52 and 54, and does not interfere significantly with the inward deflection of prongs 52 and 54 as box prong anchor 22 is inserted into an object or structure. In the exemplary embodiment, tether 64 joins opposite sides of prongs 52 and 54. That is, tether 64 is connected to the outer edge of prong 52 and to the inner edge of prong 54, relative to the overall structure of device 10 and the positions of prongs 52 and 54 thereon relative to holding portion 14. Tether 64 extends diagonally across space 66 and moves or folds easily within space 66 as necessary. However, it should be understood that tether 64 also can connect same edges or other portions of the confronting surfaces between prong 52 and prong 54, so long as tether 64 is appropriately configured and arranged to bend, fold or move as necessary within space 66 without interfering significantly with the inward deflection of prongs 52 and 54. Tether 64 can extend substantially the full lengths of prongs 52 and 54, from near ends 62 to near the connection of bases 58 to cage 50. Alternatively, tether 64 can extend less than substantially the full lengths of prongs 52 and 54.

Tether 64 inhibits excessive outward deflection of either prong 52 or prong 54. If a straight, angular, twisting or other extraction force is applied against holding device 10 after installation thereof in an object or structure such that one or both of prongs 52 and 54 is forced in an outward deflection relative to cage 50, tether 64 ties the outward deflection of each prong 52 and prong 54 to necessary bending also of the opposite prong 52 or 54. Thus, neither prong 52 nor prong 54 can be moved outwardly significantly without also bending the other of prongs 52 and 54 inwardly. Whereas insertion of holding device 10 is accomplished with prongs 52 and 54 deflecting inwardly independently, excessive outward movement of either prong 52 or 54, which may occur when an extraction force is applied, is resisted by the coupling of prongs 52 and 54 one to each other such that outward bending of one requires inward bending also of the other. Thus, more force is required for outward bending than for inward deflection. Further, with tether 64 spanning space 66, tether 64 will interfere physically with excessive outward bending of either prong 52 or prong 54 by engaging the edge of the hole in which box prong anchor 22 is installed.

It should be understood that while the present exemplary embodiment illustrates two box prong anchors 20 and 22, in some applications and uses of the present invention a single box prong anchor may be used or, alternatively, more than two box prong anchors can be used.

In the exemplary embodiment shown, holding portion 14 defines two holding areas 80, 82 and a reinforcing panel 84 there between. Holding area 80 includes opposed, spaced, inwardly angled rabbit ears 90, 92 having tethers 94, 96 respectively. A receiving cavity 98 is provided between and inwardly of rabbit ears 90, 92 relative to the opening between rabbit ears 90, 92 and the access to holding area 80. In the exemplary embodiment, cavity 98 has a rounded depression. As thus configured, holding area 80 is suitable for holding an item having a generally round or circular outer surface, such as, for example, a brake line, fuel line or other similar item. However, cavity 98 can be configured to hold other items or things. Tethers 94 and 96 connect the distal ends of rabbit ears 90 and 92 to the main body structure of holding area 80. Thus, rabbit ears 90 and 92 can be deflected by an item being pushed into cavity 98, without significant interference from tethers 94 and 96, thereby allowing the item to pass into cavity 98 easily. Conversely, if extraction force is applied against the item within cavity 98, tending to push rabbit ears 90 and 92 in an opposite direction from that in which each is bent when the item is inserted, tethers 94 and 96 resist and inhibit such bending. Accordingly, the extraction force required to dislodge an item from cavity 98 is greater than the force required to insert the item into cavity 98.

Holding area 82 is configured similarly to holding area 80. Accordingly, holding area 82 includes opposed, spaced, inwardly angled rabbit ears 100, 102 having tethers 104, 106 respectively. A receiving cavity 108 is provided between and inwardly of rabbit ears 100, 102 relative to the opening between rabbit ears 100, 102 and the access to holding area 82. In the exemplary embodiment, cavity 108 has a rounded depression. As thus configured, holding area 82 is suitable for holding an item having a generally round or circular outer surface, such as, for example, a brake line, fuel line or other similar item. However, cavity 108 can be configured to hold other items or things. Tethers 104 and 106 connect the distal ends of rabbit ears 100 and 102 to the main body structure of holding area 82. Thus, rabbit ears 100 and 102 can be deflected by an item being pushed into cavity 108, without significant interference from tethers 104 and 106, thereby allowing the item to pass into cavity 108 easily. Conversely, if extraction force is applied against the item within cavity 108, tending to push rabbit ears 100 and 102 in an opposite direction from that in which each is bent when the item is inserted, tethers 104 and 106 resist and inhibit such bending. Accordingly, the extraction force required to dislodge an item from cavity 108 is greater than the force required to insert the item into cavity 108.

It should be understood that holding portion 14 can be of other configurations for holding other items than round items such as fuel lines or brake lines. Holding portion 14 also can be configured with holding areas dissimilar to each other. Further, anchoring structure 12 including one or more box prong anchors 20, 22 can be used to secure items and devices other than ones having a holding portion 14. Thus, anchoring structure 12 including one or more box prong anchors 20, 22 can be used for securing panels or other structures and in conjunction with a holding device 10 configured with other parts, including, for example, conventional fastener ends, push-in connectors, or the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An anchoring structure for a holding device by which the device is secured for use, said anchoring structure comprising:
    first and second prongs each having a base connected within said device and each having a distal segment;
    said first and second prongs being resiliently detectable with respect to each other and confronting each other in spaced relation defining a space there between; and
    a tether connected to each of said prongs across said space defined between said prongs, said tether configured and arranged to pull against one of said first and second prongs upon bending of the other of said first and second prongs in a direction away from said one of said prongs.

2. The anchoring structure of claim 1, said tether connected between opposite edges of said first and second prongs across said space defined between said prongs.

3. The anchoring structure of claim 2, each said first and second prong having an end and a distal segment extending angularly outwardly from said end.

4. The anchoring structure of claim 3, each said first prong and said second prong having a waist between said base and said distal segment thereof, said base extending angularly outwardly toward said waist from the connection of said base to said device.

5. The anchoring structure of claim 1 including third and fourth prongs defining a space there between, and a second tether connected between said third and fourth prongs across said space defined between said third and fourth prongs.

6. The anchoring structure of claim 5, including a first cage around said first and second prongs and a second cage around said third and fourth prongs.

7. The anchoring structure of claim 6 including an arm, and said first cage and second cage being connected to said arm in spaced relation to each other.

8. A holding device comprising:
    a holding portion configured for receiving an item, for holding the item; and
    a first box prong anchor connected to said holding portion, said first box prong anchor including:
        a cage;
        first and second prongs each having a base connected to said cage and each having a distal segment, said first and second prongs being disposed in spaced relation to each other to define a space there between;
        said first and second prongs being resiliently deflectable toward each other; and
        a tether connected to each of said prongs across said space, said tether configured and arranged to pull against one of said first prong and said second prong upon bending of the other of said first prong and said second prong outwardly from said cage.

9. The holding device of claim 8, said tether connected between opposite edges of said first and second prongs across said space defined between said prongs.

10. The holding device of claim 9, each said first and second prong having an end and a distal segment extending angularly outwardly from said end.

11. The holding device of claim 10, each said first prong and said second prong having a waist between said base and said distal segment thereof, said base extending angularly outwardly toward said waist from the connection of said base to said cage.

12. The holding device of claim 8, including a second box prong anchor having a second cage, third and fourth prongs connected to said second cage in spaced relation to each other to define a space there between; and a second tether connected between said third and fourth prongs across said space defined between said third and fourth prongs.

13. The holding device of claim 12, including an arm connected to said holding portion, and said first and second box prong anchors being connected to said arm in spaced relation to each other.

14. The holding device of claim 13, said holding portion including a holding area having at least one rabbit ear and a tether from said one rabbit ear configured and arranged for inhibiting bending of said at least one rabbit ear in at least one direction.

15. The holding device of claim 14, said holding portion including first and second holding areas, each said first and second holding area having at least one rabbit ear and at least one tether configured and arranged for inhibiting bending of said at least one rabbit ear in at least one direction.

16. The holding device of claim 8, said holding portion including first and second holding areas each having at least one rabbit ear and at least one tether inhibiting bending of said at least one rabbit ear in at least one direction.

17. The holding device of claim 16, said anchor part including a second box prong anchor.

18. A box prong anchor comprising:
    a cage;
    a first prong and a second prong connected to said cage in spaced relation to each other, each said first prong and said second prong each having a waist and each tapering inward relative to said cage in opposite directions away from said waist; and
    a tether connected between said first prong and said second prong and extending through the space between said first prong and said second prong, said tether connected to and extending between opposite edges of said prongs.

* * * * *